(12) United States Patent
Maskatia et al.

(10) Patent No.: US 6,862,171 B1
(45) Date of Patent: Mar. 1, 2005

(54) PORTABLE ELECTRONIC DEVICE WITH A SLIDING UNIT

(75) Inventors: Arif Maskatia, San Jose, CA (US); Stephen Cheung, San Jose, CA (US); Erich Elkins, San Jose, CA (US); Christopher Fruhauf, San Jose, CA (US)

(73) Assignee: ACER Inc. (TW)

( * ) Notice: Subject to any disclaimer, the term of this patent is extended or adjusted under 35 U.S.C. 154(b) by 11 days.

(21) Appl. No.: 10/642,593

(22) Filed: Aug. 19, 2003

(51) Int. Cl.$^7$ .................................................. G06F 1/16
(52) U.S. Cl. ................................. 361/683; 312/223.2
(58) Field of Search ............................... 248/917–923; 361/681; 345/905; 16/221, 223; 364/708.1; 439/164, 165; 312/902, 334.7, 334.13; 384/18–19

(56) References Cited

U.S. PATENT DOCUMENTS 5,548,478 A * 8/1996 Kumar et al. ............... 361/681
6,351,372 B1 * 2/2002 Kim ............................ 361/683
6,771,493 B2 * 8/2004 Chen .......................... 361/680

* cited by examiner

Primary Examiner—Lynn Feld
Assistant Examiner—Zachary M. Pape
(74) Attorney, Agent, or Firm—Michael D. Bednarek; Shaw Pittman LLP

(57) ABSTRACT

A portable electronic device includes a base module with a housing defining upper and lower sliding grooves at each of two opposite side walls of the housing, and a system module mounted slidably on the base module through a pair of sliding units. Each of the sliding units includes an upper rolling member that is received in the upper sliding groove and that is in rolling contact with a respective one of the side walls, and a lower rolling member that is received in the lower sliding groove and that is in rolling contact with a respective one of the side walls.

8 Claims, 5 Drawing Sheets

US 6,862,171 B1

PORTABLE ELECTRONIC DEVICE WITH A SLIDING UNIT

BACKGROUND OF THE INVENTION

1. Field of the Invention

This invention relates to a portable electronic device with a system module slidably connected to an expansion base module through a sliding unit.

2. Description of the Related Art

FIGS. 1 and 2 illustrate a conventional portable computer disclosed in U.S. Pat. No. 5,548,478. The portable computer includes a base module 91 formed with a pair of opposite rail sliding grooves 911, and a display panel 92 that is mounted pivotally and slidably on the base module 91 through a pair of pivot pins 921 that respectively extend into the rail sliding grooves 911. The display panel 92 is pivotable relative to the base module 91 so as to lie on top of the base module 91 (as illustrated in FIG. 2) when the display panel 92 is slid to a front end of the base module 91. As such, the portable computer can serve as a tablet computer.

The conventional portable computer is disadvantageous in that the display panel 92 tends to be tilted or unbalanced with respect to the base module 91 during sliding on the base module 91. As a consequence, sliding movement of the display panel 92 is not smooth. Moreover, a relatively large friction between the pivot pins 921 and a housing of the base module 91 occurs due to the aforesaid tilting problem, which can result in severe wearing of the pivot pins 921 and the housing of the base module 91.

The whole disclosure of U.S. Pat. No. 5,548,478 is incorporated herein by reference.

SUMMARY OF THE INVENTION

Therefore, the object of the present invention is to provide a portable electronic device that is capable of overcoming the aforesaid drawbacks of the prior art.

According to the present invention, there is provided a portable electronic device that comprises: an expansion base module including a housing that has front and rear ends and opposite first and second side walls that extend between the front and rear ends in a longitudinal direction, each of the first and second side walls being formed with parallel upper and lower sliding grooves that extend in the longitudinal direction and that open toward each other in a transverse direction relative to the longitudinal direction; a system module mounted slidably on the expansion base module and having two opposite sides; and a pair of sliding units mounted slidably and respectively on the first and second side walls of the housing, respectively connected to the opposite sides of the system module, and slidable relative to the expansion base module in the longitudinal direction. Each of the sliding units includes a sliding seat, a first upper rolling member that is pivotally mounted on the sliding seat, that is disposed outwardly of the lower sliding groove in the respective one of the first and second side walls, that is received in the upper sliding groove in the respective one of the first and second side walls, and that is in rolling contact with the respective one of the first and second side walls, and a first lower rolling member that is pivotally mounted on the sliding seat, that is disposed outwardly of the upper sliding groove in the respective one of the first and second side walls, that is received in the lower sliding groove in the respective one of the first and second side walls, and that is in rolling contact with the respective one of the first and second side walls.

BRIEF DESCRIPTION OF THE DRAWINGS

In drawings which illustrate an embodiment of the invention.

DETAILED DESCRIPTION OF THE PREFERRED EMBODIMENT

Figure 1:
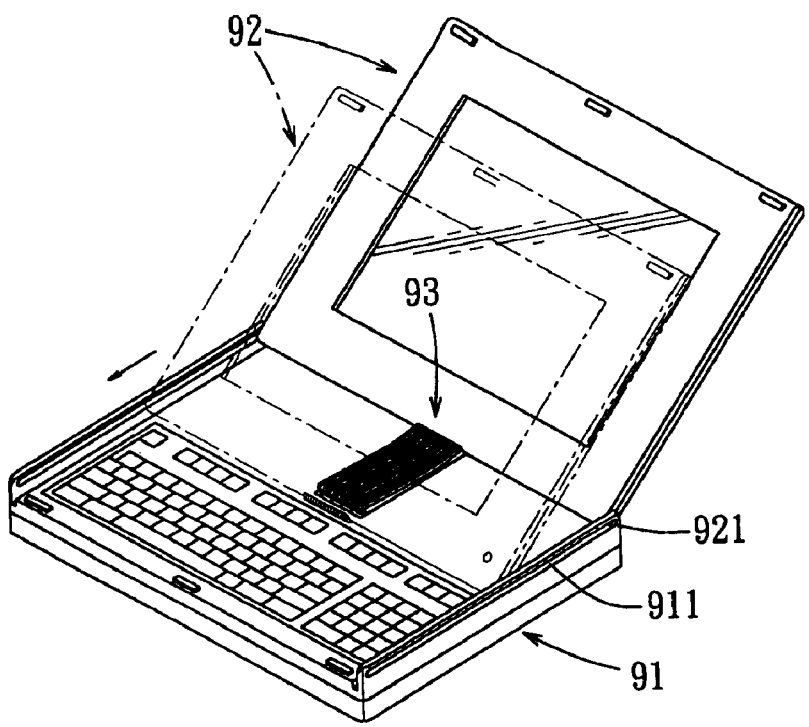
FIG. 1 is a perspective view of a conventional portable computer with a display panel disposed in an upwardly inclined state relative to a base module.
Figure 2:
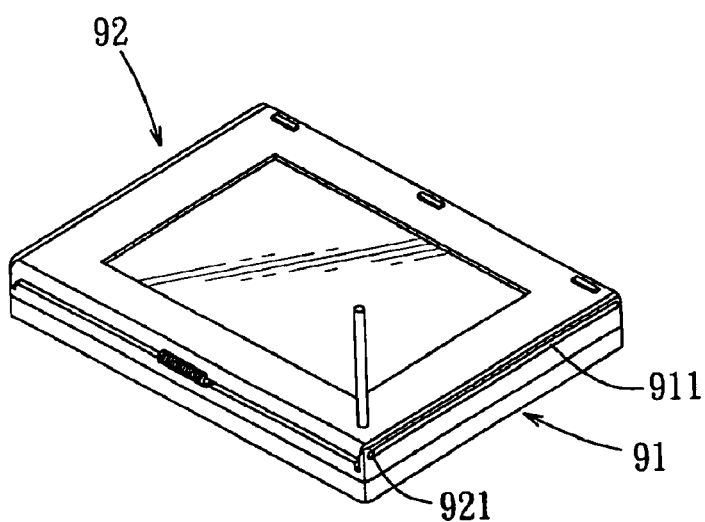
FIG. 2 is a perspective view of the portable computer of FIG. 1 with the display panel disposed in a horizontal state relative to the base module.

This invention relates to a portable electronic device, such as a portable computer, a palm PC, a pocket PC, or a cellular phone.

FIGS. 3 to 7 illustrate the preferred embodiment of a portable computer according to the present invention. The portable computer combines an expansion base module 1 and a system module 2, such as a liquid crystal display (LCD) panel, a touch input panel, or a slate computer (which normally includes a mother board, a CPU, a memory Unit, a display panel, a hard disc, a battery unit, and electronic components which allow the slate computer to function as a portable computer).

The expansion base module 1 includes a housing 3 that has front and rear ends 31, 32 and opposite first and second side walls 33 that extend between the front and rear ends 31, 32 in a longitudinal direction. Each of the first and second side walls 33 is formed with parallel upper and lower sliding grooves 361, 371 (see FIG. 4) that extend in the longitudinal direction and that open toward each other in a transverse direction relative to the longitudinal direction.

The system module 2 is mounted slidably on the expansion base module 1 through a pair of sliding units 6, and has two opposite sides 21.

The sliding units 6 are mounted slidably and respectively on the first and second side walls 33 of the housing 3, are respectively connected to the opposite sides 21 of the system module 2, and are slidable relative to the expansion base module 1 in the longitudinal direction. Each of the sliding units 6 includes a sliding seat 60 (see FIG. 5), a first upper rolling member 681 that is pivotally mounted on the sliding seat 60, that is disposed outwardly of the lower sliding groove 371 in the respective one of the first and second side walls 33 of the housing 3 (see FIGS. 6 and 7), that is received in the upper sliding groove 361 in the respective one of the first and second side walls 33 of the housing 3, and that is in rolling contact with the respective one of the first and second side walls 33 of the housing 3, and a first lower rolling member 691 that is pivotally (i.e. rotating) mounted on the sliding seat 60, that is disposed outwardly of the upper sliding groove 361 in the respective one of the first and second side walls 33 of the housing 3, that is received in the lower sliding groove 371 in the respective one of the first and second side walls 33 of the housing 3, and that is in rolling contact with the respective one of the first and second side walls 33 of the housing 3.

Each of the first and second side walls 33 of the housing 3 is indented inwardly to form an elongated recess 39 that extends between the front and rear ends 31, 32 of the housing 3 and that is defined by a recess-defining wall 30. The recess-defining wall 30 has opposite upper and lower wall portions 36, 37 that are opposite to each other in the transverse direction and that are respectively formed with the upper and lower sliding grooves 361, 371. The sliding seat 6 is received in the recess 39 in the respective one of the first and second side walls 33 of the housing 3.

Preferably, each of said sliding units 6 further includes a second upper rolling member 682 that is pivotally, (i.e. pivotally) mounted on the sliding seat 60, that is disposed outwardly of the lower sliding groove 371 in the respective one of the first and second side walls 33 of the housing 3, that is received in the upper sliding groove 361 in the respective one of the first and second side walls 33 of the housing 3, that is aligned with the first upper rolling member 681 in the longitudinal direction, and that is in rolling contact with the respective one of the first and second side walls 33 of the housing 3, and a second lower rolling member 692 that is pivotally mounted on the sliding seat 60, that is disposed outwardly of the upper sliding groove 361 in the respective one of the first and second side walls 33 of the housing 3, that is received in the lower sliding groove 371 in the respective one of the first and second side walls 33 of the housing 3, that is aligned with the first lower rolling member 691 in the longitudinal direction, and that is in rolling contact with the respective one of the first and second side walls 33 of the housing 3.

Preferably, the first and second upper rolling members 681, 682 are disposed between the first and second lower rolling members 691, 692 in such a manner that the first upper rolling member 681 is disposed adjacent to the second lower rolling member 692 and that the second upper rolling member 682 is disposed adjacent to the first lower rolling member 691 so as to enhance stability of sliding movement of the system module 2 relative to the expansion base module 1.

Preferably, each of the first and second upper rolling members 681, 682 and the first and second lower rolling members 691, 692 is in the form of a roller bearing.

The system module 2 is connected to the sliding units 6 through a cross bar 5 that defines a system-mounting groove 51 (see FIG. 7) and that has two opposite sides. The system module 2 has a lower end 22 (see FIG. 3) that extends between the opposite sides 21 of the system module 2 and that is mounted in the system-mounting groove 51. Each of the sliding units 6 further includes a hinge hub 61 that is sidewisely disposed adjacent to a respective one of the opposite sides of the cross bar 5 and a respective one of the first and second side walls 33 of the housing 3, and parallel upper and lower shafts 62, 63 (see FIG. 6) that project therefrom. Each of the opposite sides of the cross bar 5 is pivoted to the upper shaft 62 of a respective one of the sliding units 6. The lower shaft 63 of each of the sliding units 6 projects into the recess 39 in the respective one of the first and second side walls 33 of the housing 3, and is connected to the sliding seat 6.

Figure 11:
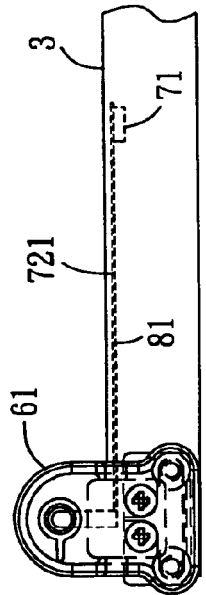
FIGS. 10 to 12 are fragmentary front, side, and top views, respectively, to illustrate how a cable is routed between the expansion base module and the system module.
Figure 10:
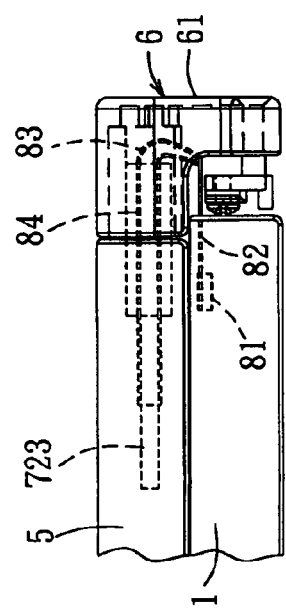
Figure 12:
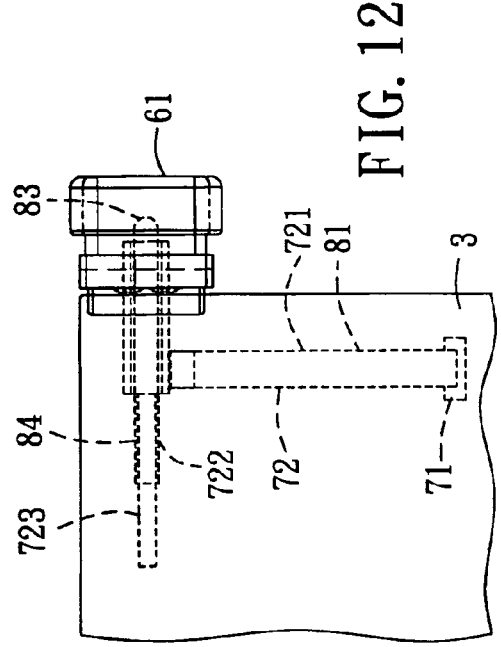

Referring to FIGS. 10 to 12, the portable electronic device of this invention further includes a connector 71 mounted in the housing 3 and disposed adjacent to one of the first and second side walls 33 of the housing 3, and a cable 72 that has a first segment 721 electrically connected to the connector 71 and extending therefrom along a first path into the hinge hub 61, a second segment 722 extending from the first segment 721 along a second path into the system-mounting groove 51 in the cross bar 5, and a third segment 723 extending from the second segment 722 and connected to the system module 2. The first path includes a first line 81 that extends from the connector 71 in the longitudinal direction to the rear end 32 of the housing 3, and a second line 82 that extends transversely from the first line 81 into the hinge hub 61. The second path includes a first line 83 that extends from the second line 82 of the first path in the transverse direction to the upper shaft 62, and a second line 84 that extends transversely from the first line 83 of the second path along the upper shaft 62 into the system-mounting groove 51. The first and third segments 721, 723 of the cable 72 are in the form of a ribbon cable. The second segment 722 of the cable 72 has a circular cross-section.

Figure 3:
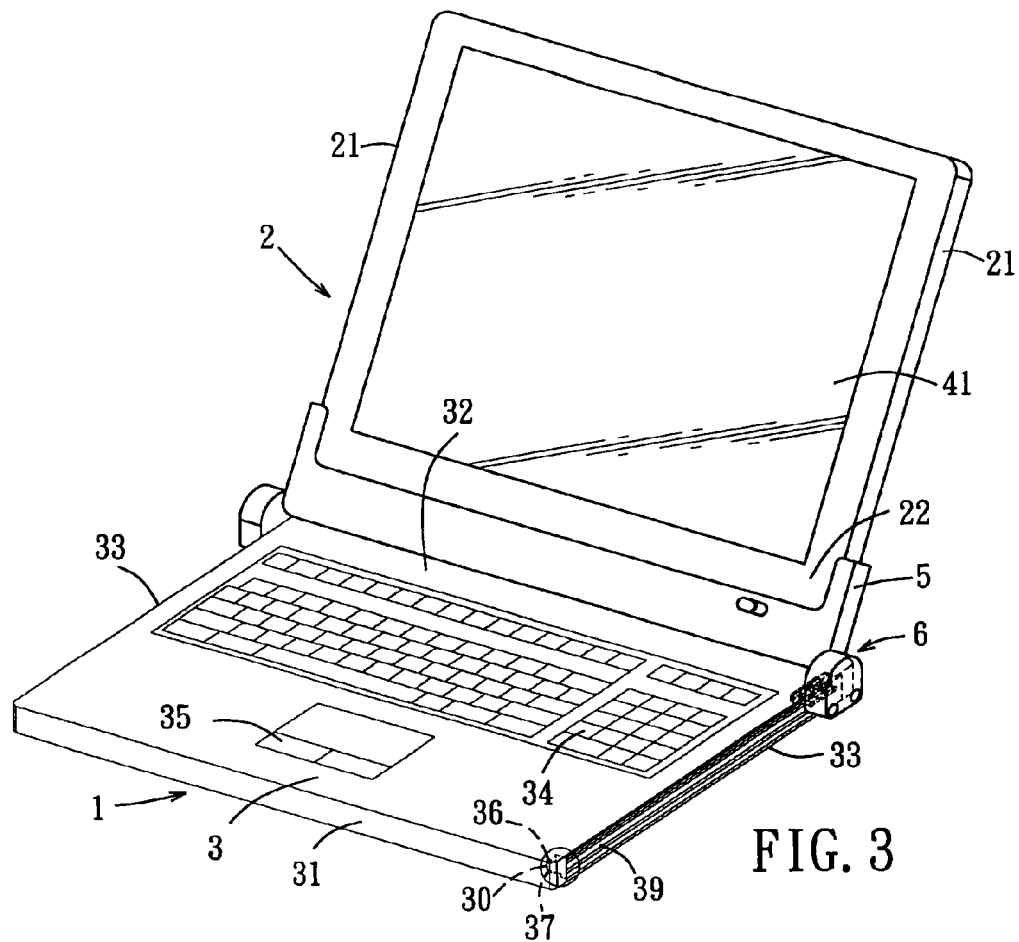
FIG. 3 is a perspective view of the preferred embodiment of a portable computer according to this invention.
Figure 5:
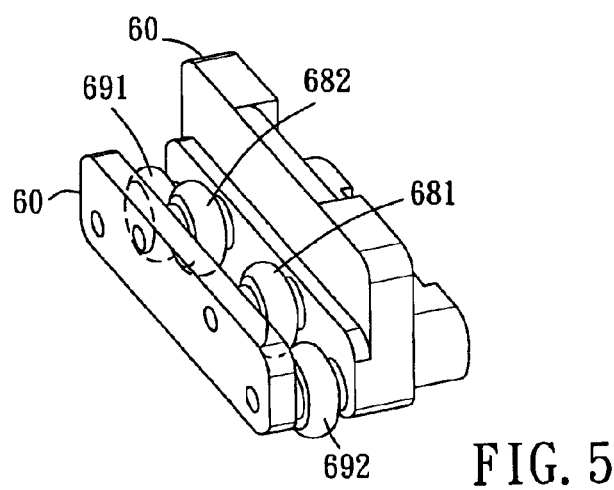
FIG. 5 is a perspective view of a sliding unit of the portable computer of FIG. 3.
Figure 4:
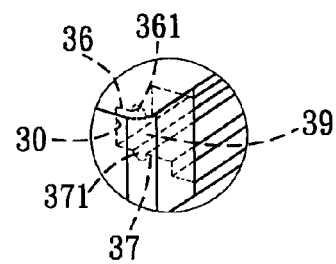
FIG. 4 is an enlarged view of an encircled portion found in FIG. 3.
Figure 6:
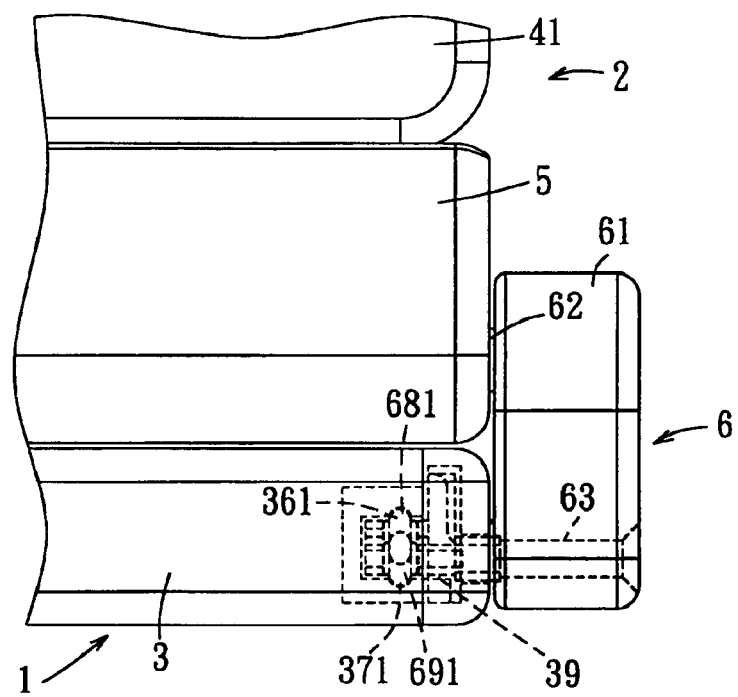
FIG. 6 is a fragmentary front view of the portable computer of FIG. 3.
Figure 7:
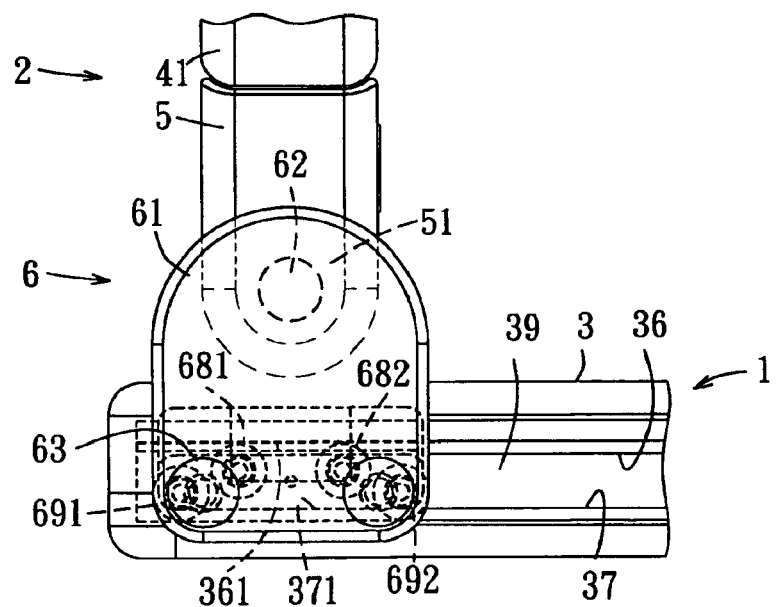
FIG. 7 is a fragmentary side view of the portable computer of FIG. 3.

Referring further to FIG. 3, the expansion base module 1 may include a keyboard 34, a touch pad 35, and peripheral components (not shown), such as a hard disc, CD-ROM, and battery. The system module 2 may include a computer slate with an LCD display panel 41, a circuit board (not shown), a CPU (not shown), and a memory module (not shown).

Figure 8:
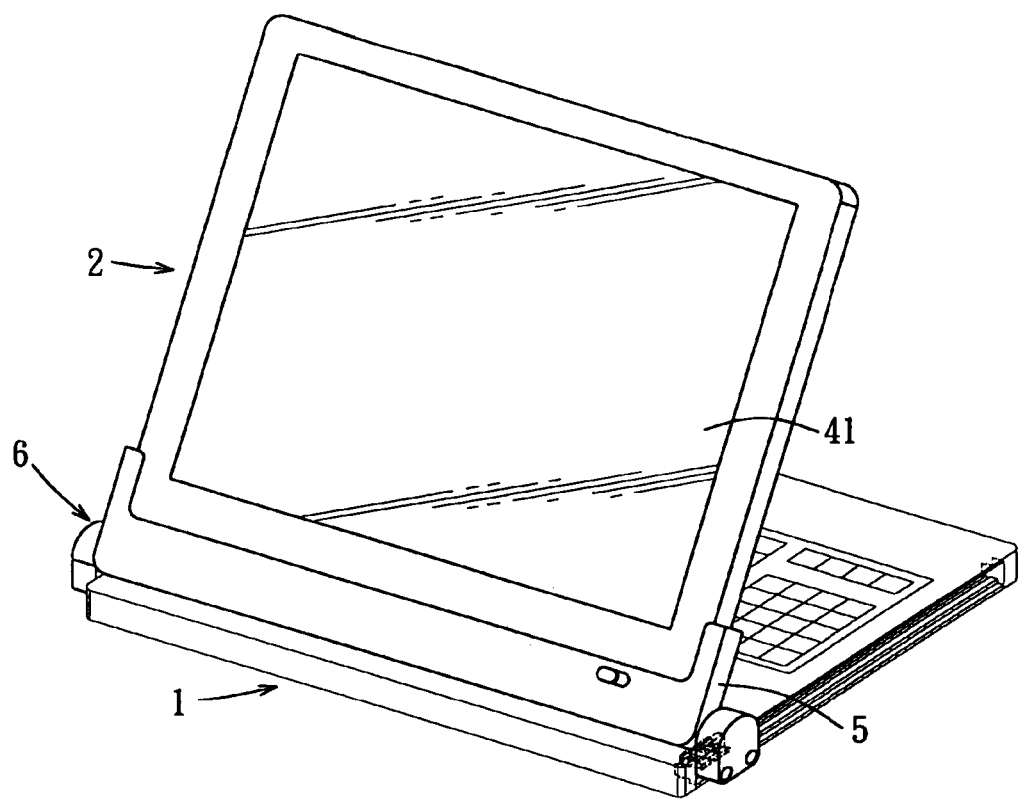
FIG. 8 is a perspective view of the portable computer of FIG. 3 with a system module slid to a front end of an expansion base module.
Figure 9:
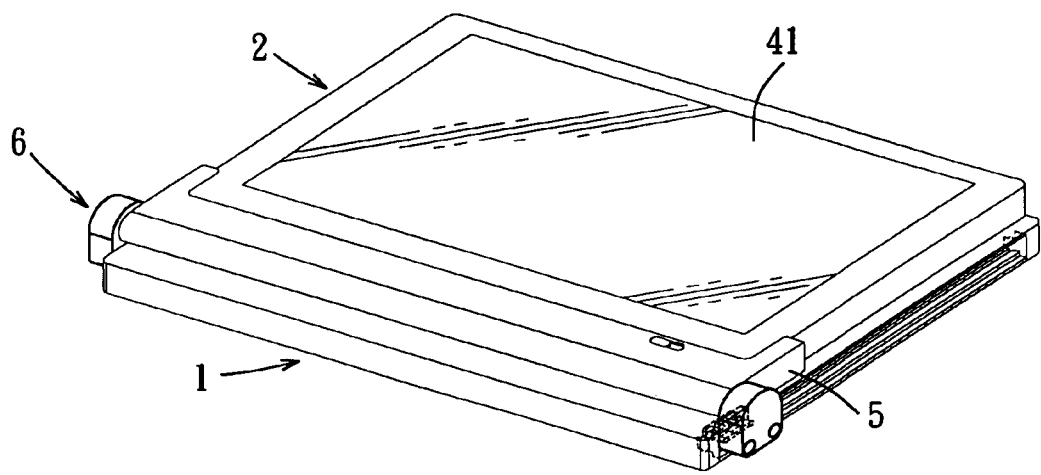
FIG. 9 is a perspective view of the portable computer of FIG. 3 with the system module pivoted to a horizontal position to lie on top of the expansion base module.

With reference to FIGS. 8 and 9, the portable computer of this invention can be easily converted into a tablet computer by sliding the system module 2 to the front end 31 of the housing 3 of the expansion base module 1 and subsequently pivoting the system module 2 about the upper shafts 62 of the sliding units 6 relative to the expansion base module 1 to a horizontal position so as to lie on top of the expansion base module 1.

With the inclusion of the first and second upper rolling members 681, 682 and the first and second lower rolling members 691, 692 of the sliding units 6 in the portable electronic device of this invention, and the corresponding upper and lower sliding grooves 361, 371 in the first and second side walls 33 of the housing 3, the aforesaid drawbacks as encountered in the prior art can be eliminated.

With the invention thus explained, it is apparent that various modifications and variations can be made without departing from the spirit of the present invention.

We claim:

1. A portable electronic device comprising:
   an expansion base module including a housing that has front and rear ends and opposite first and second side walls that extend between said front and rear ends in a longitudinal direction, each of said first and second side walls being formed with parallel upper and lower sliding grooves that extend in said longitudinal direction and that open toward each other in a transverse direction relative to said longitudinal direction;
   a system module mounted slidably on said expansion base module and having two opposite sides; and
   a pair of sliding units mounted slidably and respectively on said first and second side walls of said housing, respectively connected to said opposite sides of said system module, and slidable relative to said expansion base module in said longitudinal direction, each of said sliding units including a sliding seat, a first upper rolling member that is rotatably mounted on said sliding seat, said sliding seat is disposed outwardly of said lower sliding groove in the respective one of said first and second side walls, that is received in said upper sliding groove in the respective one of said first and second side walls, and that is in rolling contact with the respective one of said first and second side walls, and a first lower rolling member that is rotatably mounted on said sliding seat, said sliding seat is disposed outwardly of said upper sliding groove in the respective one of said first and second side walls, that is received in said lower sliding groove in the respective one of said first and second side walls, and that is in rolling contact with the respective one of said first and second side walls.

2. The portable electronic device of claim 1, wherein each of said sliding units further includes a second upper rolling member that is rotatably mounted on said sliding seat, said sliding seat is disposed outwardly of said lower sliding groove in the respective one of said first and second side walls, that is received in said upper sliding groove in the respective one of said first and second side walls, that is aligned with said first upper rolling member in said longitudinal direction, and that is in rolling contact with the respective one of said first and second side walls, and a second lower rolling member that is rotatably mounted on said sliding seat, said sliding seat is disposed outwardly of said upper sliding groove in the respective one of said first and second side walls, that is received in said lower sliding groove in the respective one of said first and second side walls, that is aligned with said first lower rolling member in said longitudinal direction, and that is in rolling contact with the respective one of said first and second side walls.

3. The portable electronic device of claim 2, wherein said first and second upper rolling members are disposed between said first and second lower rolling members.

4. The portable electronic device of claim 3, wherein each of said first and second upper rolling members and said first and second lower rolling members is in the form of a roller bearing.

5. The portable electronic device of claim 1, wherein each of said first and second side walls is indented inwardly to form an elongated recess that extends between said front and rear ends of said housing and that is defined by a recess-defining wall, said recess-defining wall having opposite upper and lower wall portions that are opposite to each other in said transverse direction and that are respectively formed with said upper and lower sliding grooves.

6. The portable electronic device of claim 5, wherein said sliding seat is received in said recess in the respective one of said first and second side walls.

7. The portable electronic device of claim 1, further comprising a cross bar that defines a system-mounting groove and that has two opposite sides, said system module having a lower end that extends between said opposite sides of said system module and that is mounted in said system-mounting groove, each of said sliding units further including a hinge hub that is sidewisely disposed adjacent to a respective one of said opposite sides of said cross bar and a respective one of said first and second side walls of said housing, and parallel upper and lower shafts that project therefrom, each of said opposite sides of said cross bar being pivoted to said upper shaft of a respective one of said sliding units, said lower shaft of each of said sliding units projecting into said recess in the respective one of said first and second side walls of said housing and being connected to said sliding seat.

8. The portable electronic device of claim 7, further comprising a connector mounted in said housing and disposed adjacent to one of said first and second side walls, and a cable that has a first segment electrically connected to said connector and extending therefrom along a first path into said hinge hub, a second segment extending from said first segment along a second path into said system-mounting groove in said cross bar, and a third segment extending from said second segment and connected to said system module, said first path including a first line that extends from said connector in said longitudinal direction to said rear end of said housing, and a second line that extends transversely from said first line into said hinge hub, said second path including a first line that extends from said second line of said first path in said transverse direction to said upper shaft, and a second line that extends transversely from said first line of said second path along said upper shaft into said system-mounting groove, said first and third segments being in the form of a ribbon cable, said second segment having a circular cross-section.

* * * * *